United States Patent [19]

Dickens, Jr.

[11] 3,965,068

[45] June 22, 1976

[54] SMOKE RETARDANT VINYL CHLORIDE AND VINYLIDENE CHLORIDE POLYMER COMPOSITIONS

[75] Inventor: Elmer D. Dickens, Jr., Richfield, Ohio

[73] Assignee: The B. F. Goodrich Company, Akron, Ohio

[22] Filed: Feb. 10, 1975

[21] Appl. No.: 548,569

[52] U.S. Cl. ............... 260/45.75 N; 260/45.75 F; 260/45.75 G; 260/45.75 P; 260/45.75 W
[51] Int. Cl.² ........................................... C08J 3/20
[58] Field of Search ............ 260/45.75 W, 45.75 N, 260/45.75 F, 45.75 G, 45.75 R, 42.49

[56] References Cited
UNITED STATES PATENTS

| | | | |
|---|---|---|---|
| 2,041,655 | 5/1936 | Gunn | 260/45.75 |
| 2,669,548 | 2/1954 | Darby et al. | 260/45.75 W |
| 2,676,942 | 4/1954 | Glass | 260/42.49 |
| 2,825,656 | 3/1958 | Walker et al. | 260/45.75 |
| 2,904,523 | 9/1959 | Hawkins et al. | 260/42.49 |
| 3,326,832 | 6/1967 | Rauschenbach | 260/45.75 |
| 3,492,267 | 1/1970 | Wood | 260/45.75 W |
| 3,666,617 | 5/1972 | Marciniak | 260/45.75 B |
| 3,796,772 | 3/1974 | Luce | 260/45.75 F |
| 3,822,234 | 7/1974 | McRowe | 260/45.75 W |
| 3,870,679 | 3/1975 | Mitchell | 260/45.75 |
| 3,880,802 | 4/1975 | Dickens | 260/45.75 |
| 3,900,441 | 9/1975 | King | 260/45.75 W |
| 3,901,850 | 8/1975 | Kurtz | 260/45.75 W |

*Primary Examiner*—V. P. Hoke
*Attorney, Agent, or Firm*—J. Hughes Powell, Jr.; E. K. Bean

[57] ABSTRACT

Smoke retardant vinyl chloride and vinylidene chloride polymer compositions are obtained by including therein a synergistic mixture of (A) at least one nickel compound selected from the group consisting of $NiCO_3$, $NiCl_2$, $NiO$, $NiS$ and nickel acetylacetonate and (B) at least one zinc compound selected from the group consisting of $ZnCO_3$, $ZnCrO_4$, $ZnMoO_4$, $Zn_3(PO_4)_2$, $Zn_2SiO_4$, $ZnSO_4$, $ZnTiO_3$, $Zn_2ZrO_4$, zinc ammonium sulfate, zinc borate, zinc acetylacetonate, zinc formate, zinc oxalate, and $M_{2-2x}Zn_{3+x}[Fe(CN)_6]_2 \cdot yH_2O$ wherein M is an alkali metal, $x$ is from 0 to 1, and $y$ is from 0 to 4. Substantial smoke retardation is also obtained by including the above nickel compound or zinc compounds individually in the vinyl chloride or vinylidene chloride polymer compositions.

32 Claims, No Drawings

SMOKE RETARDANT VINYL CHLORIDE AND VINYLIDENE CHLORIDE POLYMER COMPOSITIONS

BACKGROUND OF THE INVENTION

Vinyl chloride and vinylidene chloride polymers are known to be self-extinguishing and relatively more flame retardant than other polymers such as polyethylene, polypropylene and the like. However, a substantial amount of smoke may be produced upon exposure of vinyl chloride and vinylidene chloride polymers to a flame. Conventional flame retardants such as antimony oxide do not aid in smoke reduction.

The following art is related to the present invention. Salts and oxides of nickel or zinc are effective in amounts up to several percent as condensing agents for polyvinyl halides (U.S. Pat. No. 2,157,997). $ZnSO_4$ can be used together with an alkanolamine to improve heat degradation resistance of vinyl halide resins (U.S. Pat. No. 3,652,619). Alkali metal zinc ferrocyanides can be compounded with vinyl chloride polymers to produce improved flame resistance and to reduce smoke production (U.S. Pat. No. 3,822,234). Ger. Pat. No. 2,330,022 teaches preparation of filled thermoplastic polymer compositions such as PVC containing a carbonate such as $ZnCO_3$. Anticorrosive vinyl chloride resins are obtained by compounding the resins with ZnO, $ZnCO_3$, or certain other metallic compounds (Japan Ser. No. 73-37,742). The stabilizing effect of $ZnSO_4$, zinc oxide and other compounds on unplasticized polyvinyl chloride was evaluated in 6 *Kunstoffe-Plastics* 165–168(1959) (53 Chem.Abs.23049f). The fact that an additive is a flame retardant does not necessarily mean that it will have good smoke retardant properties, as is well known to those skilled in the art. New smoke retardant vinyl chloride and vinylidene chloride polymer compositions are desired.

SUMMARY OF THE INVENTION

Smoke retardant vinyl chloride and vinylidene chloride polymer compositions are obtained by including therein a synergistic mixture of (A) at least one nickel compound selected from the group consisting of $NiCO_3$, $NiCl_2$, NiO, NiS and nickel acetylacetonate and (B) at least one zinc compound selected from the group consisting of $ZnCO_3$, $ZnCrO_4$, $ZnMoO_4$, $Zn_3(PO_4)_2$, $Zn_2SiO_4$, $ZnSO_4$, $ZnTiO_3$, $Zn_2ZrO_4$, zinc ammonium sulfate, zinc borate, zinc acetylacetonate, zinc formate, zinc oxalate and $M_{2-2x}Zn_{3+x}[Fe(CN)_6]_2 \cdot yH_2O$, wherein M is an alkali metal, x is from 0 to 1, and y is from 0 to 4. Substantial smoke retardation is also obtained by including these zinc compounds individually in the vinyl chloride or vinylidene chloride polymer compositions: $ZnCrO_4$, $ZnMoO_4$, $Zn_3(PO_4)_2$, $Zn_2SiO_4$, $ZnTiO_3$, and zinc acetylacetonate.

DETAILED DESCRIPTION

The following compounds are novel as additives in vinyl chloride and vinylidene chloride polymer compositions and are effective individually as smoke retardants: $ZnCrO_4$, $ZnMoO_4$, $Zn_3(PO_4)_2$, $Zn_2SiO_4$, $ZnTiO_3$, and zinc acetylacetonate. Moreover, the present invention also encompasses vinyl chloride and vinylidene chloride polymer compositions containing therein synergistic mixtures of (A) at least one nickel compound selected from the group consisting of $NiCO_3$, $NiCl_2$, NiO, NiS and nickel acetylacetonate and (B) at least one zinc compound selected from the group consisting of $ZnCO_3$, $ZnCrO_4$, $ZnMoO_4$, $Zn_3(PO_4)_2$, $Zn_2SiO_4$, $ZnSO_4$, $ZnTiO_3$, $Zn_2ZrO_4$, zinc ammonium sulfate, zinc borate, zinc acetylacetonate, zinc formate, zinc oxalate and $M_{2-2x}Zn_{3+x}[Fe(CN)_6]_2 \cdot yH_2O$, wherein M is an alkali metal, x is from 0 to 1, and y is from 0 to 4. More preferably M is Lithium, potassium or sodium. Excellent results are obtained when M is potassium.

Vinyl chloride and vinylidene chloride polymers used in this invention include homopolymers, copolymers and blends of homopolymers and/or copolymers. The vinyl chloride and vinylidene chloride polymers may contain from 0 up to about 50% by weight of at least one other vinylidene monomer (i.e., a monomer containing at least one terminal $CH_2=C<$ group per molecule) copolymerized therewith, more preferably up to about 20% by weight of such monomer. These monomers include 1-olefins having from 2 to 12 carbon atoms, more preferably from 2 to 8 carbon atoms, such as ethylene, propylene, 1-butene, isobutylene, 1-hexene, 4-methyl-1-pentene and the like; dienes having from 4 to 10 carbon atoms including conjugated dienes as butadiene, isoprene, piperylene and the like; ethylidene norbornene and dicyclopentadiene; vinyl esters and allyl esters such as vinyl acetate, vinyl chloroacetate, vinyl propionate, vinyl laurate, allyl acetate and the like; vinyl aromatics such as styrene, α-methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as α-cyanomethyl acrylate, the α-, β- and γ-cyanopropyl acrylates and the like; olefinically unsaturated carboxylic acids and esters thereof, including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methylmethacrylate, ethyl methacrylate, butyl methacrylate, glycidyl methacrylate and the like, and including esters of maleic and fumaric acid and the like; amides of the α,β-olefinically unsaturated carboxylic acids such as acrylamide and the like; divinyls, diacrylates and other polyfunctional monomers such as divinyl benzene, divinyl ether, diethylene glycol diacrylate, ethylene glycol dimethacrylate, methylene-bisacrylamide, allyl pentaerythritol, and the like; bis(β-haloalkyl) alkenyl phosphonates such as bis(β-chloroethyl) vinyl phosphonate and the like; and the like.

More preferred monomers include 1-olefins having from 2 to 12 carbon atoms, more preferably from 2 to 8 carbon atoms, such as ethylene, propylene, 1-butene, isobutylene, 1-hexene, 4-methyl-1-pentene and the like; vinyl esters and allyl esters such as vinyl acetate, vinyl chloroacetate, vinyl propionate, vinyl laurate, allyl acetate and the like; olefinically unsaturated carboxylic acids and esters thereof, including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioacrylate, methyl methacrylate, ethyl methacrylate, butyl methacrylate, glycidyl methacrylate and the like, and including esters of maleic and fumaric acid and the like; and amides of $\alpha,\beta$-olefinically unsaturated carboxylic acids such as acrylamide and the like.

More preferred smoke retardant synergistic mixtures include (A) at least one nickel compound selected from the group consisting of $NiCl_2$ and $NiO$ and (B) at least one zinc compound selected from the group consisting of $ZnCO_3$, $ZnCrO_4$, $ZnMoO_4$, $Zn_2SiO_4$, zinc acetylacetonate and zinc oxalate. More preferred individual smoke retardant additives include $ZnCrO_4$ and $ZnMoO_4$. Supporting media such as $Al_2O_3$, $SiO_2$ and other substantially inert inorganic supporting materials known in the art may be used for the smoke retardant additives and in many cases are preferred, since additive surface area is greatly increased for smoke reduction purposes.

Not all nickel compound/zinc compound mixtures are synergistic, and it is difficult or impossible to predict synergism. Mixtures found to be nonsynergistic include $NiO$ and $ZnO$, $NiO$ and $ZnS$, $NiSO_4$ and $ZnMoO_4$, $NiWO_4$ and $Zn_2P_2O_7$, and $NiWO_4$ and $Zn_2SiO_4$. Other nonsynergistic combinations include nickel citrate and $ZnSO_4$, nickel formate and $ZnS$, $NiMoO_4$ and zinc ammonium sulfate, $NiMoO_4$ and zinc formate, and $NiSO_4$ and zinc oxalate. Thus, it was surprising and unexpected to find synergistic smoke reduction using the specific nickel compound/zinc compound mixtures of this invention.

The additive compounds used in this invention are polycrystalline or amorphous fine powders, preferably with an average particle size less than about 200 microns, more preferably from about 0.5 to about 150 microns. Polymer compositions containing the additives may have colors similar to, although somewhat lighter than, the additives themselves. The additive compounds are used in total amounts from about 0.01 to about 20 parts by weight per 100 parts by weight of polymer. Use of more than about 20 parts by weight of additive per 100 parts by weight of polymer probably will affect adversely other important physical properties, such as tensile strength and the like.

The vinyl chloride and vinylidene chloride polymers may be prepared by any method known to the art such as by emulsion, suspension, bulk or solution polymerization. The additive compounds may be mixed with the polymer emulsion, suspension, solution or bulk mass before monomer recovery and/or drying. More preferably the compounds may be mixed with dry granular or powdered vinyl halide polymers. The polymer and compound may be mixed thoroughly in granular of powder form in apparatus such as a Henschel mixer and the like. Alternatively, this step may be eliminated and the mixing done while the polymer mass is fluxed, fused and masticated to homogeneity under fairly intensive shear in or on a mixer apparatus having its metal surface in contact with the material. The fusion temperature and time will vary according to the polymer composition and level of additive compound but will generally be in the range of about 300° to 400°F and 2 to 10 minutes.

Smoke retardancy may be measured using a NBS Smoke Chamber according to procedures described by Gross et al., "Method for Measuring Smoke from Burning Materials", *Symposium on Fire Test Methods — Restraint j Smoke* 1966, ASTM STP 422, pp. 166–204. Maximum smoke density $(D_m)$ is a dimensionless number and has the advantage of representing a smoke density independent of chamber volume, specimen size or photometer path length, provided a consistent dimensional system is used. Maximum rate of smoke generation $(R_m)$ is defined in units of min-116 [1]. Percent smoke reduction is calculated using this equation:

$$\frac{D_m/g \text{ of sample} - D_m/g \text{ of control}}{D_m/g \text{ of control}} \times 100.$$

The term $D_m/g$ means maximum smoke density per gram of sample. $D_m$ and other aspects of the physical optics of light transmission through smoke are discussed fully in the above ASTM publication.

Smoke retardance may be measured quickly using the Goodrich Smoke-Char Test. Test samples may be prepared by dry blending polymer resin and smoke retardant additives. The blend is ground in a liquid $N_2$-cooled grinder to assure uniform dispersion of the smoke retardant additives in the resin. Small (about 0.3 g) samples of the polymer blend are pressed into pellets about ¼ inch in diameter for testing. Alternatively, test samples may be prepared by blending resin, smoke retardant additives and lubricant(s) or processing aid(s) in a blender such as an Osterizer blender. The blend is milled, pressed into sheets, and cut into small (about 0.3 gram) samples for testing. The test samples are placed on a screen and burned for 60 seconds with a propane gas flame rising vertically from beneath the sample. Sample geometry at a constant weight has been found not to be significant for the small samples used in this test. A Bernz-O-Matic pencil flame burner head is used with gas pressure maintained at 40 psig. The sample is immersed totally and continuously in the flame. Smoke from the burning sample rises in a vertical chimney and passes through the light beam of a Model 407 Precision Wideband Photometer (Grace Electronics, Inc., Cleveland, Ohio) coupled with a photometer integrator. Smoke generation is measured as integrated area per gram of sample.

The vinyl chloride and vinylidene chloride polymer compositions of this invention may contain the usual compounding ingredients known to the art such as fillers, stabilizers, opacifiers, lubricants, processing aids, impact modifying resins, plasticizers, antioxidants and the like.

The following examples illustrate the present invention more fully.

EXAMPLES 1 — 3

The following recipe was used:

| MATERIAL | PARTS |
| --- | --- |
| Polyvinyl Chloride* | 100.0 |
| Polyethylene Powder Processing Aid | 1.5 |
| Additive (A)** | Variable |
| Additive (B)*** | Variable |

*Homopolymer having an inherent viscosity of about 0.92–99; ASTM classification GP-4-15443.
**Nickel compound selected from the group consisting of $NiCO_3$, $NiCl_2$, $NiO$, $NiS$ and nickel acetylacetonate. The control sample contained no additive.
***Zinc compound selected from the group consisting of $ZnCO_3$, $ZnCrO_4$, $ZnMoO_4$, $Zn_3(PO_4)_2$, $Zn_2SiO_4$, $ZnSO_4$, $ZnTiO_3$, $Zn_2ZrO_4$, zinc ammonium sulfate, zinc borate, zinc acetylacetonate, zinc formate, zinc oxalate, and $M_{2-2x}Zn_{3+x}[Fe(CN)_6]_2 \cdot yH_2O$, wherein M is alkali metal, x is from 0 to 1, and y is from 0 to 4. The control sample contained no additive.

Each experimental sample was prepared by milling the recipe materials on a two-roll mill for about 5 minutes at a roll surface temperature of about 320°F. The milled samples were pressed into 6 × 6 × 0.075 inch sheets with the exception of Example 3, where 6 × 6 × 0.050 inch sheet was used. Pressing was done at about 310°–320°F using 40,000 lbs. of force applied to a 4-in. ram. The samples were given a 2 minute preheat prior to pressing for 8 minutes under full load.

The molded samples were cut into 3 × 3 × 0.075 inch sections with the exception of Example 3, where a 3 × 3 × 0.050 inch section was used. Testing was performed using the flaming mode of the NBS Smoke Chamber Test (ASTM STP 422, pp. 166–204) described heretofore. Test results are given in Table I.

| MATERIAL | PARTS |
|---|---|
| Polyvinyl Chloride* | 100.0 |
| Additive (A)** | Variable |
| Additive (B)*** | Variable |

*Homopolymer having an inherent viscosity of about 0.92–0.99; ASTM Classification GP-4-15443.
**Nickel compound selected from the group consisting of $NiCO_3$, $NiCl_2$, NiO, NiS and nickel acetylacetonate. The control sample contained no additive.
***Zinc compound selected from the group consisting of $ZnCO_3$, $ZnCrO_4$, $ZnMoO_4$, $Zn_3(PO_4)_2$, $Zn_2SiO_4$, $ZnSO_4$, $ZnTiO_3$, $Zn_2ZrO_4$, zinc ammonium sulfate, zinc borate, zinc acetylacetonate, zinc formate, zinc oxalate, and $M_{2-2x}Zn_{3+x}[Fe(CN)_6]_2 \cdot yH_2O$, wherein M is an alkali metal, x is from 0 to 1, and y is from 0 to 4. The control sample contained no additive.

TABLE I

| Example | Additive (A) (phr) | Additive (B) (phr) | Maximum Rate of Smoke Generation ($R_m$, min$^{-1}$) | Maximum Smoke Density per Gram of Sample ($D_m/g$) | Smoke Reduction (%) |
|---|---|---|---|---|---|
| Control* | (No Additive) | (No Additive) | 428 | 54.2 | — |
| 1 | NiO (2) | — | 285 | 50.7 | 6.5 |
|  | — | $Zn_3(PO_4)_2$ (2) | 240 | 24.7 | 54.4 |
|  | NiO (1) | $Zn_3(PO_4)_2$ (1) | 132 | 21.4 | 60.5 |
| 2 | NiO (5)* | — | 198 | 43.0 | 20.7 |
|  | — | $Zn_3(PO_4)_2$ (5) | 228 | 27.7 | 48.9 |
|  | NiO (4) | $Zn_3(PO_4)_2$ (1) | 124 | 15.9 | 70.7 |
| 3 | NiO (5) | — | 247 | 48.9 | 28.7 |
|  | — | Zinc borate (5)** | 376 | 32.3 | 52.9 |
|  | NiO (4) | Zinc borate (1)** | 227 | 26.2 | 61.8 |

*This sample contained 1.0 part polyethylene powder processing aid instead of 1.5 parts.
**$2ZnO \cdot 3B_2O_3 \cdot 3.5H_2O$.

The above results demonstrate that the additive mixtures used in this invention are synergistic and substantially retard smoke formation during burning of rigid polyvinyl chloride in the NBS Smoke Chamber (ASTM STP 422, pp. 166–204). The results also demonstrate the smoke retardant effects of individual additives in the same test.

EXAMPLES 4 – 21

The following recipe was used:

Each experimental sample was prepared by blending resins and additives in a liquid $N_2$-cooled grinder to assure uniform dispersion of the smoke retardant additives in the resin. Small (about 0.3 gram) samples of the polymer blend were pressed into pellets about ¼ inch in diameter and tested using the Goodrich Smoke-Char Test described heretofore. Test results are given in Table II.

TABLE II

| Example | Additive (A) (phr) | Additive (B) (phr) | Smoke Formation per Gram of Sample | Smoke Reduction(%) |
|---|---|---|---|---|
| Control | None | None | 67.4 | — |
| 4 | $NiCO_3$ (5) | — | 45.9 | 31.9 |
|  | — | $M_{2-2x}Zn_{3+x}[Fe(CN)_6]_2 \cdot yH_2O$ (5)* | 44.7 | 33.7 |
|  | $NiCO_3$ (4) | $M_{2-2x}Zn_{3+x}[Fe(CN)_6]_2 \cdot yH_2O$ (1)* | 26.6 | 60.5 |
| 5 | $NiCl_2$ (5) | — | 35.5 | 47.3 |
|  | — | $ZnCO_3$ (5) | 66.1 | 1.9 |
|  | $NiCl_2$ (4) | $ZnCO_3$ (1) | 15.2 | 77.4 |
| 6 | $NiCl_2$ (5) | — | 35.5 | 47.3 |
|  | — | Zinc acetylacetonate (5) | 53.6 | 20.5 |
|  | $NiCl_2$ (4) | Zinc acetylacetonate (1) | 23.3 | 65.4 |
| 7 | NiO (5) | — | 29.3 | 56.5 |
|  | — | $ZnCO_3$ (5) | 66.1 | 1.9 |
|  | NiO (4) | $ZnCO_3$ (1) | 9.1 | 86.5 |
| 8 | NiO (5) | — | 29.3 | 56.5 |
|  | — | $ZnCrO_4$ (5) | 29.2 | 56.7 |
|  | NiO (4) | $ZnCrO_4$ (1) | 14.3 | 78.8 |
| 9 | NiO (5) | — | 29.3 | 56.5 |
|  | — | $M_{2-2x}Zn_{3+x}[Fe(CN)_6]_2 \cdot yH_2O$ (5)* | 44.7 | 33.7 |
|  | NiO (4) | $M_{2-2x}Zn_{3+x}[Fe(CN)_6]_2 \cdot yH O$ (1)* | 22.2 | 67.1 |
| 10 | NiO (5) | — | 29.3 | 56.5 |
|  | — | $ZnMoO_4$ (5) | 14.6 | 78.3 |
|  | NiO (4) | $ZnMoO_4$ (1) | 4.2 | 93.8 |
| 11 | NiO (5) | — | 29.3 | 56.5 |
|  | — | $Zn_2SiO_4$ (5) | 52.1 | 22.7 |
|  | NiO (4) | $Zn_2SiO_4$ (1) | 15.0 | 77.7 |
| 12 | NiO (5) | — | 29.3 | 56.5 |
|  | — | $ZnSO_4$ (5) | 43.7 | 35.2 |
|  | NiO (4) | $ZnSO_4$ (1) | 26.7 | 60.4 |
| 13 | NiO (5) | — | 29.3 | 56.5 |
|  | — | $ZnTiO_3$ (5) | 61.1 | 9.3 |
|  | NiO (4) | $ZnTiO_3$ (1) | 21.1 | 68.7 |
| 14 | NiO (5) | — | 29.3 | 56.5 |
|  | — | $Zn_2ZrO_4$ (5) | 65.8 | 2.4 |
|  | NiO (4) | $Zn_2ZrO_4$ (1) | 19.9 | 70.5 |

TABLE II-continued

| Example | Additive (A) (phr) | Additive (B) (phr) | Smoke Formation per Gram of Sample | Smoke Reduction(%) |
|---|---|---|---|---|
| 15 | NiO (5) | — (5) | 29.3 | 56.5 |
|  | — | Zinc acetylacetonate (5) | 53.6 | 20.5 |
|  | NiO (4) | Zinc acetylacetonate (1) | 26.7 | 60.4 |
| 16 | NiO (5) | — | 29.3 | 56.5 |
|  | — | Zinc oxalate (5) | 43.6 | 35.3 |
|  | NiO (4) | Zinc oxalate (1) | 14.7 | 78.2 |
| 17 | NiS (5) | — | 38.3 | 43.2 |
|  | — | $ZnCrO_4$ (5) | 29.2 | 56.7 |
|  | NiS (4) | $ZnCrO_4$ (1) | 20.4 | 69.7 |
| 18 | NiS (5) | — | 38.3 | 43.2 |
|  | — | $Zn_3(PO_4)_2$ (5) | 41.0 | 39.2 |
|  | NiS (4) | $Zn_3(PO_4)_2$ (1) | 25.8 | 61.7 |
| 19 | Nickel acetylacetonate (5) | — | 47.7 | 29.2 |
|  | — | $Zn_2ZrO_4$ (5) | 65.8 | 2.4 |
|  | Nickel acetylacetonate (4) | $Zn_2ZrO_4$ (1) | 27.6 | 59.0 |
| 20 | NiO (5) | — | 29.3 | 56.5 |
|  | — | Zinc ammonium sulfate (5) | 50.2 | 25.5 |
|  | NiO (4) | Zinc ammonium sulfate (5) | 23.6 | 65.0 |
| 21 | NiO (5) | — | 29.3 | 56.5 |
|  | — | Zinc formate (5) | 54.0 | 19.9 |
|  | NiO (4) | Zinc formate (1) | 19.9 | 70.5 |

*Mixture of about 60% by weight $K_2Zn_3[Fe(CN)_6]_2$ and 40% by weight $Zn_4[Fe(CN)_6]_2$.

These results demonstrate that the defined additives substantially reduce smoke evolution during forced burning of rigid polyvinyl chloride in the Goodrich Smoke-Char Test. The results also demonstrate the smoke retardant effects of individual additives in the same test.

The improved smoke retardant vinyl chloride and vinylidene chloride polymer compositions of this invention are useful wherever smoke resistance is desirable, such as in carpets, house siding, plastic components for airplane interiors, and the like. Of course, overall suitability for a particular use will depend upon other factors as well, such as comonomer type and level, compounding ingredient type and level, polymer particle size, etc.

I claim:

1. A smoke retardant composition comprising a vinyl chloride or vinylidene chloride polymer together with (A) at least one nickel compound selected from the group consisting of $NiCO_3$, $NiCl_2$, NiO, NiS and nickel acetylacetonate and (B) at least one zinc compound selected from the group consisting of $ZnCO_3$, $ZnCrO_4$, $ZnMoO_4$, $Zn_3(PO_4)_2$, $Zn_2SiO_4$, $Zn_2SO_4$, $ZnTiO_3$, $Zn_2ZrO_4$, zinc ammonium sulfate, zinc borate zinc acetylacetonate, zinc formate, zinc oxalate, and $M_{2-2x}Zn_{3+x}[Fe(CN)_6]_2 \cdot yH_2O$, wherein M is an alkali metal, $x$ is from 0 to 1, and $y$ is from 0 to 4, said compounds (A) and (B) being present in a total amount from about 0.25 to about 20 weight parts per 100 weight parts of polymer.

2. A composition of claim 1 wherein said polymer contains copolymerized therewith up to about 50% by weight of at least one other vinylidene monomer containing at least one terminal $CH_2=C<$ group per molecule.

3. A composition of claim 2 wherein said polymer contains copolymerized therewith up to about 20% by weight of said other vinylidene monomer.

4. A composition of claim 3 wherein said other vinylidene monomer is selected from the group consisting of 1-olefins having from 2 to 12 carbon atoms, vinyl esters, $\alpha,\beta$-olefinically unsaturated carboxylic acids and esters thereof, amides of $\alpha,\beta$-olefinically unsaturated carboxylic acids, and esters of fumaric and maleic acid.

5. A composition of claim 4 wherein said compound has an average particle size less than about 200 microns, and M is lithium, potassium or sodium.

6. A composition of claim 5 wherein said compound (A) is NiO and said compound (B) is $Zn_3(PO_4)_2$.

7. A composition of claim 5 wherein said compound (A) is NiO and said compound (B) is zinc borate.

8. A composition of claim 5 wherein said compound (A) is $NiCO_3$ and said compound (B) is $M_{2-2x}Zn_{3+x}[Fe(CN)_6]_2 \cdot yH_2O$.

9. A composition of claim 5 wherein said compound (A) is $NiCl_2$ and said compound (B) is $ZnCO_3$.

10. A composition of claim 5 wherein said compound (A) is $NiCl_2$ and said compound (B) is zinc acetylacetonate.

11. A composition of claim 5 wherein said compound (A) is NiO and said compound (B) is $ZnCO_3$.

12. A composition of claim 5 wherein said compound (A) is NiO and said compound (B) is $ZnCrO_4$.

13. A composition of claim 5 wherein said compound (A) is NiO and said compound (B) is $M_{2-2x}Zn_{3+x}[Fe(CN)_6]_2 \cdot yH_2O$.

14. A composition of claim 5 wherein said compound (A) is NiO and said compound (B) is $ZnMoO_4$.

15. A composition of claim 5 wherein said compound (A) is NiO and said compound (B) is $Zn_2SiO_4$.

16. A composition of claim 5 wherein said compound (A) is NiO and said compound (B) is $ZnSO_4$.

17. A composition of claim 5 wherein said compound (A) is NiO and said compound (B) is $ZnTiO_3$.

18. A composition of claim 5 wherein said compound (A) is NiO and said compound (B) is $Zn_2ZrO_4$.

19. A composition of claim 5 wherein said compound (A) is NiO and said compound (B) is zinc acetylacetonate.

20. A composition of claim 5 wherein said compound (A) is NiS and said compound (B) is $ZnCrO_4$.

21. A composition of claim 5 wherein said compound (A) is NiS and said compound (B) is $Zn_3(PO_4)_2$.

22. A composition of claim 5 wherein said compound (A) is nickelacetylacetonate and said compound (B) is $Zn_2ZrO_4$.

23. A composition of claim 5 wherein said compound (A) is NiO and said compound (B) is zinc oxalate.

24. A composition of claim 5 wherein said compound (A) is NiO and said compound (B) is zinc ammonium sulfate.

25. A composition of claim 5 wherein said compound (A) is NiO and said compound (B) is zinc formate.

26. A smoke retardant composition comprising a vinyl chloride or vinylidene chloride polymer together with at least one compound selected from the group consisting of $Zn_3(PO_4)_2$ and $ZnTiO_3$, said compound being present in an amount from about 0.01 to about 20 weight parts per 100 weight parts of polymer.

27. A composition of claim 26 wherein said polymer contains copolymerized therewith up to about 50% by weight of at least one other vinylidene monomer containing at least one terminal $CH_2=C<$ group per molecule.

28. A composition of claim 27 wherein said polymer contains copolymerized therewith up to about 20% by weight of said other vinylidene monomer.

29. A composition of claim 28 wherein said other vinylidene monomer is selected from the group consisting of 1-olefins containing from 2 to 12 carbon atoms, vinyl esters, $\alpha,\beta$-olefinically unsaturated carboxylic acids and esters thereof, amides of $\alpha,\beta$-olefinically unsaturated carboxylic acids, and esters of fumaric and maleic acid.

30. A composition of claim 29 wherein said compound has an average particle size less than about 200 microns.

31. A composition of claim 30 wherein said compound is $Zn_3(PO_4)_2$.

32. A composition of claim 30 wherein said compound is $ZnTiO_3$.

* * * * *

UNITED STATES PATENT OFFICE
CERTIFICATE OF CORRECTION

PATENT NO. : 3,965,068
DATED : June 22, 1976
INVENTOR(S) : Elmer D. Dickens, Jr.

It is certified that error appears in the above-identified patent and that said Letters Patent are hereby corrected as shown below:

Column 3 third line from the bottom delete "J" after the word RESTRAINT and insert ---&---.

Column 4 line 4 delete "min-116$^1$" and insert ---min$^{-1}$.---

Signed and Sealed this twenty-sixth Day of July 1977

[SEAL]

Attest:

RUTH C. MASON
Attesting Officer

C. MARSHALL DANN
Commissioner of Patents and Trademarks